(12) United States Patent
Davidovits et al.

(10) Patent No.: US 9,194,988 B2
(45) Date of Patent: *Nov. 24, 2015

(54) LIGHT-POLARIZING ARTICLE AND DYE DISPERSION AND METHOD FOR MAKING SAME

(75) Inventors: Jerome Vivien Davidovits, Thomery (FR); Bruno Dufour, Champagne sur Seine (FR); David Henry, Morigny-Champigny (FR)

(73) Assignee: Corning Incorporated, Corning, NY (US)

( * ) Notice: Subject to any disclaimer, the term of this patent is extended or adjusted under 35 U.S.C. 154(b) by 585 days.

This patent is subject to a terminal disclaimer.

(21) Appl. No.: 12/521,035

(22) PCT Filed: Feb. 26, 2008

(86) PCT No.: PCT/US2008/002478
§ 371 (c)(1),
(2), (4) Date: Jun. 24, 2009

(87) PCT Pub. No.: WO2008/106098
PCT Pub. Date: Sep. 4, 2008

(65) Prior Publication Data
US 2010/0060984 A1  Mar. 11, 2010

(30) Foreign Application Priority Data

Feb. 28, 2007 (EP) ..................... 07300837
May 30, 2007 (EP) ..................... 07301075

(51) Int. Cl.
  G02B 5/30 (2006.01)
  G02B 1/10 (2015.01)
(52) U.S. Cl.
  CPC .............. G02B 5/3033 (2013.01); G02B 1/105 (2013.01); Y10T 428/1041 (2015.01); Y10T 428/31504 (2015.04); Y10T 428/31663 (2015.04)
(58) Field of Classification Search
  CPC .... G02B 5/3025; G02B 5/3033; G02B 1/105; C09K 19/60; Y10T 428/1041
  USPC .................................................. 516/74, 204
  See application file for complete search history.

(56) References Cited

U.S. PATENT DOCUMENTS

| | | | | |
|---|---|---|---|---|
| 2,400,877 A | * | 5/1946 | Dreyer | 359/487.02 |
| 3,043,784 A | * | 7/1962 | Remer | 252/509 |
| 3,069,361 A | * | 12/1962 | Cogswell | 252/363.5 |
| 3,188,163 A | * | 6/1965 | Kuhefuss et al. | 8/679 |
| 3,352,787 A | * | 11/1967 | Bodach | 134/42 |
| 3,838,160 A | * | 9/1974 | Molina | 252/301.19 |
| 3,912,653 A | * | 10/1975 | Alburger | 252/408.1 |
| 4,090,967 A | * | 5/1978 | Falk | 252/3 |
| 4,404,290 A | | 9/1983 | Boudot | |
| 4,540,672 A | | 9/1985 | Boudot et al. | |
| 4,683,153 A | | 7/1987 | Goepfert et al. | |
| 4,742,028 A | | 5/1988 | Boudot et al. | |
| 4,839,314 A | | 6/1989 | Boudot et al. | |
| 4,877,697 A | * | 10/1989 | Vollmann et al. | 430/20 |
| 5,023,209 A | | 6/1991 | Grateau et al. | |
| 5,426,077 A | | 6/1995 | Brocheton et al. | |
| 5,501,725 A | * | 3/1996 | Lauw et al. | 106/31.32 |
| 5,597,622 A | | 1/1997 | Zoller et al. | |
| 5,916,967 A | * | 6/1999 | Jones et al. | 524/732 |
| 6,049,428 A | * | 4/2000 | Khan et al. | 359/487.02 |
| 6,121,176 A | | 9/2000 | Comte | |
| 6,248,285 B1 | | 6/2001 | Henry et al. | |
| 6,329,482 B1 | | 12/2001 | Henry | |
| 6,335,051 B1 | * | 1/2002 | Kausch et al. | 427/163.1 |
| 6,736,633 B1 | | 5/2004 | Dawson-Elli et al. | |
| 6,743,011 B2 | | 6/2004 | Bakshi et al. | |
| 6,837,076 B2 | | 1/2005 | Hawtof | |
| 8,062,542 B2 | * | 11/2011 | Biteau et al. | 252/62.56 |
| 8,551,582 B2 | * | 10/2013 | Gesell et al. | 428/1.31 |
| 2004/0162386 A1 | * | 8/2004 | Altes et al. | 524/806 |

(Continued)

FOREIGN PATENT DOCUMENTS

EP   1674898 A1   6/2006
WO   00/22463   4/2000

OTHER PUBLICATIONS

Brown et al, "Static and dynamic properties of nonionic amphiphile micelles: Triton X-100 in aqueous solution", J. Phys. Chem., 1989, 93 (6), pp. 2512-2519, (Mar. 1989).*

(Continued)

Primary Examiner — Daniel S Metzmaier
(74) Attorney, Agent, or Firm — Kevin L. Bray

(57) ABSTRACT

A polarizing dye dispersion, a light-polarizing article and a process for making light-polarizing article utilizing the polarizing dye dispersion. The aqueous polarizing dye dispersion comprises, in addition to a polarizing dye material, a nonionic surfactant material comprising a plurality of surfactant molecules represented by the following general formula (I): wherein: the average of the number n of all the surfactant molecules ranges from 9 to 200; m is 1 or 2; R, identical or different for each surfactant molecule and each occurrence, independently is an alkyl; at least one R on each surfactant molecule is a C6-C12 straight-chain or branched alkyl; and X, identical or different for each surfactant molecule, independently is an H or a C1-C4 alkyl.

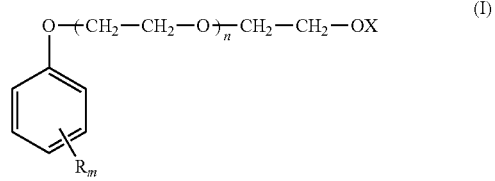

(I)

14 Claims, 2 Drawing Sheets

(56) References Cited

U.S. PATENT DOCUMENTS

| | | |
|---|---|---|
| 2007/0130995 A1 | 6/2007 | Hawtof et al. |
| 2009/0053516 A1* | 2/2009 | Davidovits et al. ........... 428/339 |
| 2011/0091692 A1* | 4/2011 | Davidovits et al. ........... 428/172 |
| 2014/0302248 A1* | 10/2014 | Davidovits et al. ........... 427/500 |

OTHER PUBLICATIONS

Milton J. Rosen, Surfactants and Interfacial Phenomena, Third Edition, p. 262-266, John Wiley & Son, NY, NY, USA, (Aug. 31, 2004).*

STN online—File REG, RN 117428-22-5, Entered STN Nov. 11, 1988.*

STN online—File REG, RN 6358-85-6, Entered STN Nov. 16, 1984.*

Derwent Abstract, week 201064, London: Derwent Publications Ltd., AN 2010-F48634, US 20090053516 A1, (Corning Inc), abstract.*

Hannam, A. R., and D. Patterson. "The optical properties of some azo pigments." Journal of the Society of Dyers and Colourists 79.5 (1963): pp. 192-197.*

Ash, Michael & Ash, Irene (1993). Handbook of Industrial Surfactants. Gower Publ. Co., Brookfield, Vermont, pp. 258, 535, 708 and 709.*

Schmidt et al.; "Shear Orientation of Lyotropic Hexagonal Phases"; J. Phys. Chem. B 1998, 102, 507-513.

Bobrov et al.; "Novel Dichroic Polarizing Materials and Approaches to Large-Area Processing"; Mat. Res. Soc. Symp. Proc. vol. 508, 1998; pp. 225-228.

Ruslim et al.; "Structural Characteristics of the Chromonic Mesophases of C.I. Direct Blue 67"; Langmuir 2003, 19, 3686-3691.

* cited by examiner

LIGHT-POLARIZING ARTICLE AND DYE DISPERSION AND METHOD FOR MAKING SAME

CROSS-REFERENCE TO RELATED APPLICATIONS

This application claims the benefit of priority under 35 U.S.C. §119 of European Patent Application Serial No. 07301075.3 filed on May 30, 2007.

FIELD

The present invention relates to light-polarizing articles and method of making the same, and polarizing dye dispersion for making the same. In particular, the present invention relates to polarizing optical products having a light-polarizing layer comprising a plurality of aligned polarizing dye molecules as well as aqueous polarizing dye dispersion and method for making the same. The present invention is useful in producing, for example, polarizing ophthalmic products, optical elements and display products.

BACKGROUND

A linear light-polarizing filter allows light having electric field in a certain plane to transmit at a higher rate than light having an orthogonal electric field. Polarizing filters have been widely used in, for example, ophthalmic products, display devices, imaging devices and optical communication devices. Polarizing ophthalmic lenses are interesting because they have the unique ability to preferentially eliminate glare that is reflected from smooth surfaces such as water and ice.

Dichroic materials have been used for the manufacture of light-polarizing articles. Dichroic materials, when properly oriented, can preferentially transmit light polarized in a particular direction. Such dichroic material may be polarizing over a relatively wide spectrum, such as the visible spectrum, or they may have the polarization property over a narrow range of wavelength. A group of dichroic material is called pleochroic dyes. A pleochroic dye molecule has varying absorption depending on the orientation of the electric field of the incident light. Some pleochroic dyes are self-orienting when placed on a suitable substrate, others have to be combined with other materials to produce the polarizing effect.

As taught by U.S. Pat. No. 2,400,877, an oriented dichroic dye layer may be formed by depositing them onto a surface that has been gently brushed or rubbed in a single direction. This patent reference also discloses that by stretching a polymeric film, such as cellulose and derivatives thereof, proper orienting force may be obtained for dichroic dyes deposited thereon.

Light-polarizing articles, such as polarizing ophthalmic lenses, have been manufactured by using various technologies and materials. Most of these products comprise a light-polarizing layer in addition to a non-polarizing substrate. The light-polarizing layer is mostly formed from a dichroic material mentioned above. The light-polarizing products hitherto produced and processes for the manufacture thereof have suffered from various drawbacks.

One problem of certain prior art product is the distortion of the optical surface by the light-polarizing layer in the final product. Some of the light-polarizing articles in the prior art are produced by laminating a pre-formed polarizing layer to a substrate. It is difficult, if not impossible, to allow the pre-formed polarizing layer to curve to a perfect fit with a contoured surface of the substrate, as is in the case of ophthalmic products. The less than perfect fit between the light-polarizing layer and the substrate can lead to undesired cylindrical power in an ophthalmic lens.

A second problem of certain prior art process and products is delamination of the light-polarizing layer from the substrate during the manufacture process or during the life of the product. This is caused by, for example, (i) a less sufficient adhesion between the substrate and the light-polarizing layer; and/or (ii) stress between the layers having differing properties, especially differing thermal expansion coefficient.

Still another problem of certain prior art polarizing product and processes for making them involves the leaching of substrate component into the light-polarizing layer. The leaching, or migration, can cause the deterioration of the mechanical and/or optical quality of the light-polarizing layer over time.

A fourth problem of certain prior art article and process is the hazing of the article. Various causes contribute to this problem. The propagation and expansion of defects, optical and mechanical, on a micro-scale originally, is believed to be the leading culprit.

A fifth problem of certain prior art article and process is the delamination between the polarizing dye layer and any additional coating applied over it, such as scratch-resistant coatings, hard coatings, water-repellant coatings, and the like.

European patent application publication No. 1674898 discloses a process for making polarizing articles. By depositing an inorganic adhesion-promoting layer between the lens substrate and the light-polarizing dye layer, the invention disclosed therein solved the problem of poor adhesion between the substrate and the light-polarizing dye layer.

Furthermore, it is desired that the polarizing article has a high polarization efficiency. For example, for polarizing ophthalmic lenses, it is desired that road glare due to reflection be reduced as much as possible. A polarization efficiency of higher than 99% would be desired for high-end light-polarizing lenses.

Consequently there is a genuine need for a polarizing article overcoming one or more drawback of the prior art and a process for making such articles.

SUMMARY

According to a first aspect of the present invention, provided is an aqueous polarizing dye dispersion comprising: a plurality of polarizing dye molecules and a non-ionic surfactant material comprising a plurality of surfactant molecules represented by the following general formula (I):

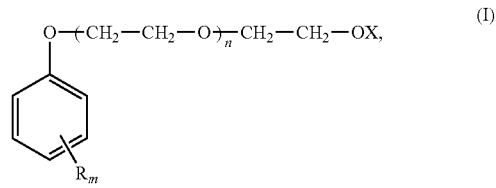

wherein:

the average of the number n of all the surfactant molecules ranges from 9 to 200, in certain embodiments from 9 to 150, in certain embodiments from 9 to 100, in certain embodiments from 9 to 80, in certain other embodiments from 9 to 50, in certain other embodiments from 10 to 50;

m is 1 or 2;

R, identical or different for each surfactant molecule and each occurrence, independently is an alkyl;

at least one R on each surfactant molecule is a C6-C12 straight-chain or branched alkyl, in certain embodiments a C8-C10 straight-chain or branched alkyl, in certain other embodiments a straight-chain or branched C9-C10 alkyl, in certain other embodiments a C9 straight-chain or branched alkyl; and X, identical or different for each surfactant molecule, independently is a hydrogen or a C1-C4 alkyl.

In certain embodiments of the dispersion of the present invention, the concentration of the non-ionic surfactant ranges from 0.1% to 10%, in certain embodiments from 0.2% to 5%, in certain other embodiments from 0.4% to 1%, by weight of the total weight of the dispersion.

In certain embodiments of the dispersion of the present invention, the surfactant molecules can be divided into the following two groups (A) and (B):

(A), having a total number of molecules MA, wherein the average of the number n of the molecules ranges from 5 to 20; and (B), having a total number of molecules MB, wherein the average of the number n of all the molecules ranges from 30 to 200.

In certain embodiments of the dispersion of the present invention, the ratio MA/MB ranges from 1/10 to 10/1.

In certain embodiments of the dispersion of the present invention, the ratio MA/MB ranges from 1/10 to 1/5.

In certain embodiments of the dispersion of the present invention, in Group (A), the polydispersity index of the surfactant molecules ranges from 1 to 2; and in Group (B), the polydispersity index of the surfactant molecules ranges from 1 to 2.

In certain embodiments of the dispersion of the present invention, the average molecular weight of all the non-ionic surfactant molecules is from 620 to 10,000 $g \cdot mol^{-1}$, in certain embodiments from 700 to 2000 $g \cdot mol^{-1}$; in certain other embodiments from 750 to 2000 $g \cdot mol^{-1}$; in certain other embodiments from 800 to 1800 $g \cdot mol^{-1}$.

In certain embodiments of the dispersion of the present invention, the polarizing dye molecules are selected from C.I. Direct Blue 67, C.I. Direct Blue 90; C.I. Direct Green 59; C.I. Direct Violet 48; C.I. Direct Red 39; C.I. Direct Red 79; C.I. Direct Red 81; C.I. Direct Red 83; C.I. Direct Red 89; C.I. Direct orange 39; C.I. Direct Orange 72; C.I. Acid Red 37; C.I. Direct Yellow 34; C.I. Direct Green 26; C.I. Direct Green 51; and mixtures and combinations thereof.

In certain embodiments of the dispersion of the present invention, the polarizing dye molecules comprise an anion group on the molecular structure thereof.

A second aspect of the present invention relates to a process for making a light-polarizing article, comprising the following steps:

(A) providing a light-transmitting substrate having at least one surface;

(B) forming a plurality of micro-grooves on the surface of the substrate;

(C) coating the surface having micro-grooves with the polarizing dye dispersion described summarily supra and in greater detail infra; and (D) forming a polarizing dye layer on the surface.

In certain embodiments of the process of the present invention, step (A) comprises the following sub-step (A2):

(A2) depositing an inorganic intermediate adhesion-promoting layer on the surface of the substrate;

and step (B) comprises forming a plurality of micro-grooves on the surface of the inorganic intermediate adhesion-promoting layer.

In certain embodiments of the process of the present invention, in step (A2), the adhesion-promoting layer consists essentially of an inorganic material selected from: oxides of Si, Al, Zr, Ti, Ge, Sn, In, Zn, Sb, Ta, Nb, V, Y, and mixtures and combinations thereof.

Certain embodiments of the process of the present invention further comprise the following step (F):

(F) forming a second functional layer over the polarizing dye layer.

Certain embodiments of the process of the present invention further comprises the following step (E) between steps (D) and (F):

(E) forming a first coupling layer directly over and contiguous with the polarizing dye layer.

In certain embodiments of the process of the present invention, step (E) comprises forming a first coupling layer comprising a molecular structure bearing ionic groups having charges opposite to the polarizing dye molecules, or groups capable of forming ions having charges opposite to the polarizing dye molecules of the first functional layer.

In certain embodiments of the process of the present invention, in step (E), the light-polarizing dye molecules comprise an anionic group on the molecular structure thereof.

A third aspect of the present invention relates to a light-polarizing article comprising a substrate having a surface, a first functional layer comprising a plurality of aligned polarizing dye molecules over at least part of the surface, characterized in that the first functional layer further comprises a non-ionic surfactant material comprising a plurality of surfactant molecules represented by the general formula (I) described summarily supra in connection with the polarizing dye dispersion of the present invention.

In certain embodiments of the light-polarizing article of the present invention, the surfactant molecules can be divided into the following two groups (A) and (B):

(A), having a total number of molecules MA, wherein the average of the number n of the molecules ranges from 9 to 20; and (B), having a total number of molecules MB, wherein the average of the number n of all the molecules ranges from 40 to 100.

In certain embodiments of the light-polarizing article of the present invention, the ratio MA/MB ranges from 1/10 to 10/1.

In certain embodiments of the light-polarizing article of the present invention, the ratio MA/MB ranges from 1/10 to 1/5.

In certain embodiments of the light-polarizing article of the present invention, in Group (A), the polydispersity index of the surfactant molecules ranges from 1.0 to 2.0, and in Group (B), the polydispersity index of the surfactant molecules ranges from 1.0 to 2.0.

In certain embodiments of the light-polarizing article of the present invention, the average molecular weight of all the non-ionic surfactants is from 620 to 10,000 $g \cdot mol^{-1}$, in certain embodiments from 700 to 2000 $g \cdot mol^{-1}$; in certain other embodiments from 750 to 2000 $g \cdot mol^{-1}$; in certain other embodiments from 800 to 1800 $g \cdot mol^{-1}$.

In certain embodiments of the light-polarizing article of the present invention, the polarizing dye molecules are selected from: C.I. Direct Blue 67, C.I. Direct Blue 90; C.I. Direct Green 59; C.I. Direct Violet 48; C.I. Direct Red 39; C.I. Direct Red 79; C.I. Direct $3d 81; C.I. Direct Red 83; C.I. Direct Red 89; C.I. Direct orange 39; C.I. Direct Orange 72; C.I. Acid Red 37; C.I. Direct Yellow 34; C.I. Direct Green 26; C.I. Direct Green 51; and mixtures and combinations thereof.

In certain embodiments of the light-polarizing article of the present invention, the polarizing dye molecules comprise an anion group on the molecular structure thereof.

Certain embodiments of the light-polarizing article of the present invention further comprise a second functional layer over the first functional layer.

Certain embodiments of the light-polarizing article of the present invention further comprise a first coupling layer between the first functional layer and the second functional layer.

In certain embodiments of the light-polarizing article of the present invention, the polarizing dye molecules in the first functional layer bear an anion group, and the molecular structure of the first coupling layer bears ionic groups having charges opposite to the polarizing dye molecules, or groups capable of forming ions having charges opposite to the polarizing dye molecules of the first functional layer.

In certain embodiments of the light-polarizing article of the present invention, the first functional layer is formed on a plurality of micro-grooves on at least part of the surface of the substrate.

In certain embodiments of the light-polarizing article of the present invention, the micro-grooves are formed on an inorganic material.

In certain embodiments of the light-polarizing article of the present invention, the micro-grooves are formed on the surface of an inorganic intermediate adhesion-promoting layer.

In certain embodiments of the light-polarizing article of the present invention, the first functional layer further comprises a polymer that immobilizes the light-polarizing dyes.

Certain embodiments of the light-polarizing article of the present invention have one or more of the following advantages: (i) high polarization efficiency and low haze due to the improved performance of the non-ionic surfactant material; (ii) strong adhesion between the polarizing dye layer and any additional functional layer, such as protective layers, due to the presence of the first coupling layer. The light-polarizing articles thus could be made with high polarization efficiency, low haze, and strong resistance to water, sweat, high humidity, and other deleterious use conditions. Moreover, where the light-polarizing article is a polarizing lens, the lens making process can be conducted in a small-scale lab, such as a typical ophthalmic lab, with desired results.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION

Figure 1:
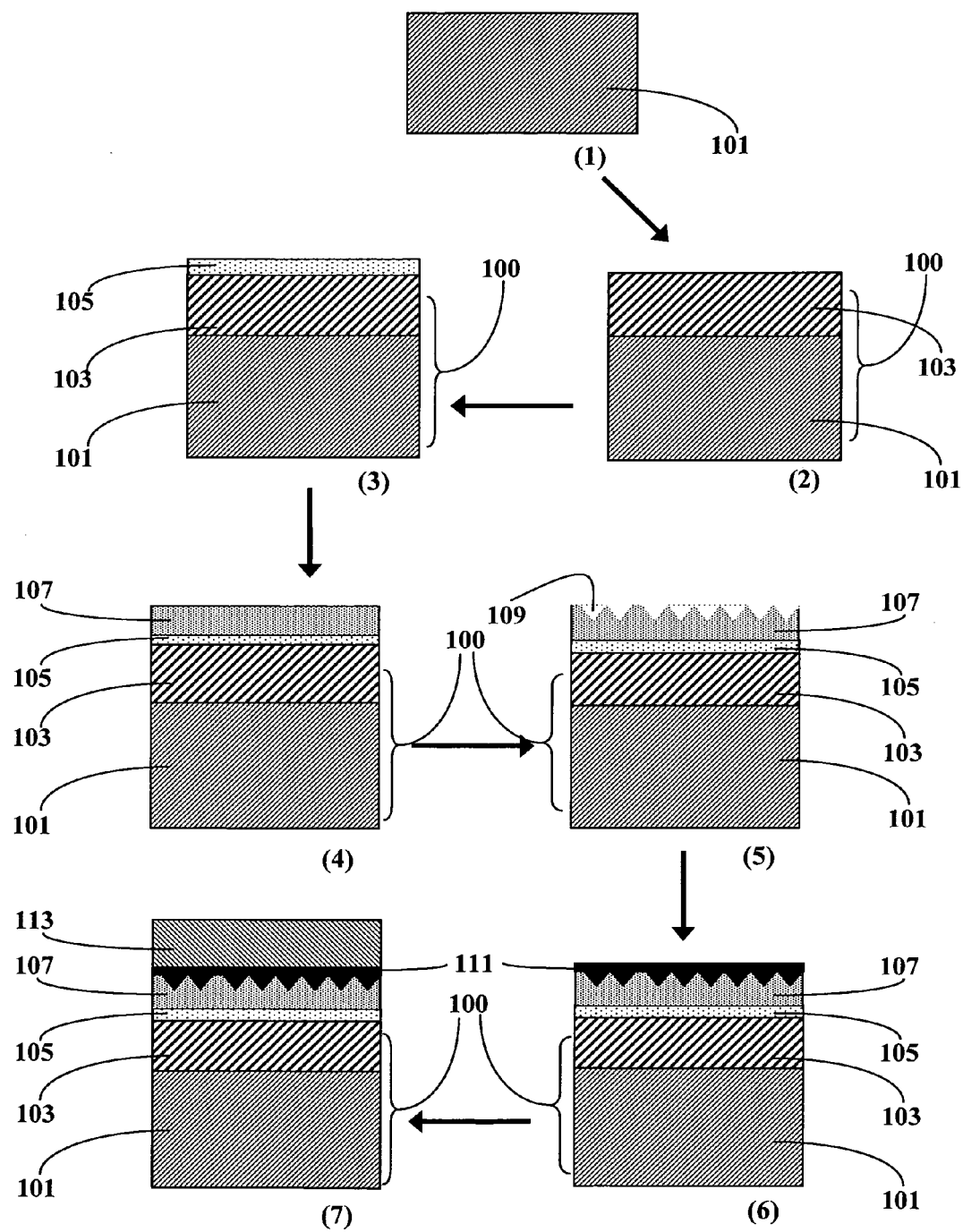
FIG. 1 is a schematic illustration of the structure and manufacture process thereof of an embodiment of the light polarizing article of the present invention.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, "ophthalmic product" or "ophthalmic article" means any semi-finished and finished, powered and non-powered, tinted and non-tinted, photochromic and non-photochromic, inorganic glass-based and polymer-based eye-wear products, including sun-glass products and prescription eye-wear products, and blanks thereof; goggles; visors; and the like.

Unless otherwise specified, the term "oxide" as used herein in the present application includes stoichiometric oxides, oxygen deficient oxides and oxygen excess oxides. For example, the term "oxide of silicon" or "silicon oxide" in the present application means a material having the formula $SiO_x$, where x may be larger than 2 (oxygen excess) or smaller than 2 (oxygen deficient). However, $SiO_2$ means a stoichiometric oxide in which the molar ratio of Si to oxygen atoms is 1:2. For the purpose of the present application, the formula SiO means oxygen deficient silicon oxide $SiO_y$, where $0.5 \leq y \leq 1.8$, in certain embodiments $0.5 \leq y \leq 1.5$. For another example, "oxide of aluminum" or "aluminum oxide" in the present application means a material having the chemical formula $Al_2O_z$, where z may be larger than 3 (oxygen excess) or smaller than 3 (oxygen deficient). Thus silicon or the metal in the oxides may be at various valences, not just the usual valences. Chemical vapor deposition can be used to produce oxygen deficient or oxygen excess oxides of silicon and/or metals.

"Polysiloxane" as used herein in the present application are polymer materials having a backbone structure comprising —O—Si—O—Si— linkages and organic side groups, including linear and crosslinked polymers of siloxanes. U.S. Pat. No. 4,981,530 describes various types of cross-linked polysiloxane that can be used in the present invention. Polysiloxanes and preparation thereof are further described in, e.g., "Silicones", Volume 15, p. 204-308, Encyclopedia of polymer science and engineering, by Bruce Hardman and Arnold Torkelson, from the General Electric Company. One of ordinary skill in the art understands that polysiloxanes can be prepared from, e.g., various siloxanes and/or silanes by various methods, including but not limited to hydrolysis and polycondensation in aqueous media, with or without the use of basic or acidic catalysts. One skilled in the art also understands that a layer of polysiloxane can be formed by coating a substrate with a dispersion of polysiloxane in liquid media (especially aqueous media), with or without additional heat treatment of the coated material. Coating can be effected by dipping, impregnation, spin coating, and the like.

"Cx-Cy alkyl" means a straight or branched saturated hydrocarbon chain having from x to y carbon atoms. For example, "C1-C4 alkyl" means a straight or branched saturated hydrocarbon chain having from 1 to 4 carbon atoms. Example C1-C4 alkyl groups include methyl, ethyl, propyl, isopropyl, butyl, sec-butyl, and tert-butyl.

Where the relevant groups or radicals in the present application are substituted, they may be substituted by, for example, but not limited to, an alkyl, a halogen, an epoxy, a (meth)acryloxy, alkoxy, an hydroxyl, and the like, as appropriate.

The term "(meth)acrylate" is intended to include acrylate, methacrylate and combination or mixture thereof.

By "dispersion" is meant a material system in which the relevant material is disposed. Thus, a dispersion can be a solution, an emulsion or a suspension. By "aqueous" is meant that the material system comprises water, with or without other solvents. Thus an aqueous dispersion is a solution, an emulsion or a suspension comprising water, with or without additional solvent, such as an alcohol.

The process for making light-polarizing article as disclosed in European Patent Application Publication No. 1674898 includes a step of applying a polarizing dye dispersion comprising light-polarizing dye molecules to a surface of a substrate having micro-grooves formed thereon. It was found that the light-polarizing dye molecules can align themselves on the grooved surface to form a light-polarizing layer imparting the light-polarizing characteristics to the light-polarizing article.

The present inventors studied and researched the polarizing dye dispersion and made the present invention which involves an improvement to the polarizing dye dispersion that can result in a high polarization efficiency and low haze to the final light-polarizing article.

Thus according to a first aspect of the present invention, provided is an aqueous polarizing dye dispersion comprising: a plurality of polarizing dye molecules; and a non-ionic surfactant material comprising a plurality of surfactant molecules represented by the general formula (I) described supra.

The phenyl group can be substituted by a single alkyl or two alkyls on any available position on the benzene ring. In certain embodiments, only one R substituent exists on the phenyl ring, and the R group is a straight-chain alkyl. In certain other embodiments, two R substituents exit on the phenyl ring, and both R groups can be a straight-chain or branched alkyl as described above. At least one R is a C6-C12 straight-chain or branched alkyl. Thus, in cases where the surfactant molecule comprises only one R, that R is a C6-C12 alkyl. In cases where the surfactant molecule comprises two R, one of the two R groups is a C6-C12 alkyl. The other R group, can be a C1-C20 alkyl, such as a C6-C12 alkyl, for example, in certain embodiments of the present invention.

Assuming the total number of surfactant molecules having formula (I) in the surfactant material in the polarizing dye dispersion of the present invention is k. The number n of all k molecules are listed in descending order to form a permutation $n(1), n(2), n(3), \ldots, n(k-2), n(k-1), n(k)$. The average of the number n ($n(av)$) of all the surfactant molecules is calculated as follows:

$$n(av) = \frac{\sum_{i=1}^{k} n(i)}{k}.$$

Thus, in the polarizing dye dispersion of certain embodiments of the present invention, in an actual surfactant molecule having formula (I), n can be 0, 1, 2, 3, 4, 5, ..., 10, ..., 20, ... 30, ... 40, ... 50, ... 100, ... 200, ... and the like, as long as the average of the number n of all surfactant molecules is in the range as recited above. It has been found that in general, an average of number n of all molecules higher than 8 is beneficial for obtaining a polarization efficiency of higher than 99% after a protective layer as a second functional layer is formed over the polarization layer. The polyethyleneoxy chain in formula (I) imparts hydrophilicity to the surfactant molecule, and the alkyl-bearing phenyl group imparts hydrophobicity to the surfactant molecule. It is believed a longer polyethyleneoxy chain can result in a higher hydrophilicity to the surfactant molecule. The average of the number n of the molecules can be determined, e.g., by mass spectroscopy and other means.

In the polarizing dye dispersion of certain embodiments of the present invention, the group X in some of the surfactant molecules is a hydrogen. In other embodiments, the group X in some of the surfactant molecules is a C1-C4 alkyl. In certain embodiments, the surfactant material consists essentially of surfactant molecules in which the group X is a hydrogen. The surfactant material may comprise a mixture of surfactant molecules in which X is a hydrogen, and surfactant molecules in which X is any alkyl.

In certain embodiments of the polarizing dye dispersion of the present invention, the surfactant molecules can be divided into the following two groups (A) and (B) below:

(A), having a total number of molecules MA, wherein the average of number n of all the surfactant molecules ranges from 5 to 20; and (B), having a total number of molecules MB, wherein the average of number n of all the molecules ranges from 30 to 200.

According to certain embodiments of the polarizing dye dispersion of the present invention, the ratio MA/MB ranges from 1/10 to 10/1.

According to certain other embodiments of the polarizing dye dispersion of the present invention, the ratio MA/MB ranges from 1/10 to 1/5. Surprisingly, the present inventors have found this combination of surfactant molecules having a long polyethyleneoxy chain and surfactant molecules having a relatively shorter polyethyleneoxy chain, with a larger proportion of the surfactant molecules having a relatively longer polyethyleneoxy chain, resulted in a very high polarization efficiency and a very low haze in the polarizing article formed according to the present invention.

According to certain embodiments of the polarizing dye dispersion of the present invention, the polydispersity index of the surfactant molecules in Group (A) above ranges from 1 to 2, and the polydispersity index of the surfactant molecules in Group (B) above ranges from 1 to 2. Polydispersity index (PI) of the surfactant molecules is defined as the ratio of the weight average molecular weight ($\overline{M_w}$) to the number average molecular weight ($\overline{M_n}$) of the surfactant material:

$$PI = \frac{\overline{M_w}}{\overline{M_n}}.$$

According to certain embodiments of the polarizing dye dispersion of the present invention, the number average molecular weight of all the non-ionic surfactant molecules is from 620 to 10,000 g·mol$^{-1}$, in certain embodiments from 700 to 2000 g·mol$^{-1}$; in certain other embodiments from 750 to 2000 g·mol$^{-1}$; in certain other embodiments from 800 to 1800 g·mol$^{-1}$.

The amount of the surfactant material in the polarizing dye dispersion can range from 0.1% to 10%, in certain embodiments from 0.2% to 5%, in certain other embodiments from 0.4% to 1%, by weight of the total weight of the dispersion.

The non-ionic surfactant material having formula (I) useful for the polarizing dye dispersion of the present invention is available commercially. For example, the following surfactants and combinations thereof can be used as the surfactant material in the polarizing dye dispersion of the present invention: Tergitol® NP40, Tergitol® NP10 available from Union Carbide Chemicals & Plastics Technology Corp., Igepal® CO 720, Igepal® CO 890, Igepal® CA 720, Igepal® DM 970 from GAF Corp., Lutensol® NP100, Lutensol® NP10 from BASF. Of these, Tergitol® NP40 are found to be particularly advantageous for certain embodiments of the present invention; and a combination of Tergitol® NP40 and Igepal® CO720 are particularly advantageous for other embodiments.

The polarizing dye molecules in the polarizing dye dispersion of the present invention can be dichroic dyes. References mentioning such dichroic dyes include, for example, U.S. Pat. No. 2,400,877 and WO 00/22463. A single dichroic dye may be used in the polarizing dye dispersion to impart the polarizing effect as well as a desired color or tint, such as grey, to the end light-polarizing product. However, it is not excluded that a combination of various dichroic dyes may be used in the light-polarizing layer. Indeed, it is known to one skilled in the art that various dichroic dyes having colors ranging from red, yellow to blue, may be used alone or in combination at various proportions to impart the desired polarizing effect and color to the final product. Many polarizing dye molecules are organic compounds.

In certain embodiments of the polarizing dye dispersion of the present invention, at least a part of the polarizing dye molecules bear ionic groups on the molecule structure. The ionic groups can bear negative or positive charges. In certain preferred embodiments, the polarizing dye molecules bear anionic groups. Those anion-bearing polarizing dye molecules can be water-soluble when paired with a certain cation to form a water-soluble salt, and upon deposition to a surface, rendered water-insoluble by ion-exchange into a water-insoluble salt of another ion. For example, certain polarizing dye molecules are water-soluble when paired with $NH_4^+$, $Na^+$ or $K^+$ ions, but once exchanged with $Al^{3+}$, $Ca^{2+}$ and/or $Mg^{2+}$-containing aqueous solutions, they precipitate in the form of water-insoluble salt. A light-polarizing dye layer in certain embodiments of the light-polarizing article of the present invention can be formed in this manner.

Non-limiting examples of commercially available polarizing dyes that can be used in various embodiments of the polarizing dye dispersion of the present invention are listed in the following TABLE I below.

The amount of the polarizing dye molecules in the polarizing dye dispersion of the present invention can be chosen by one of ordinary skill in the art according to the teachings of the present invention, depending on the particular dye to be used, the amount of dye needed to produce the desired polarizing effect to the final light-polarizing product, solubility of the polarizing dye(s) in the chosen solvent, the process by which the polarizing dye dispersion will be applied in the process of manufacturing the light-polarizing product, and the like. For example, in certain embodiments of a polarizing dye dispersion of the present invention comprising dichroic dyes having ionic groups on the structure thereof, the total amount of the polarizing dye(s) in the polarizing dye dispersion can range from 0.1% to 8% by weight of the total weight of the dispersion, in certain embodiments from 0.5% to 8%, in certain other embodiments from 1% to 6%, in certain other embodiments from 3% to 5%.

TABLE I

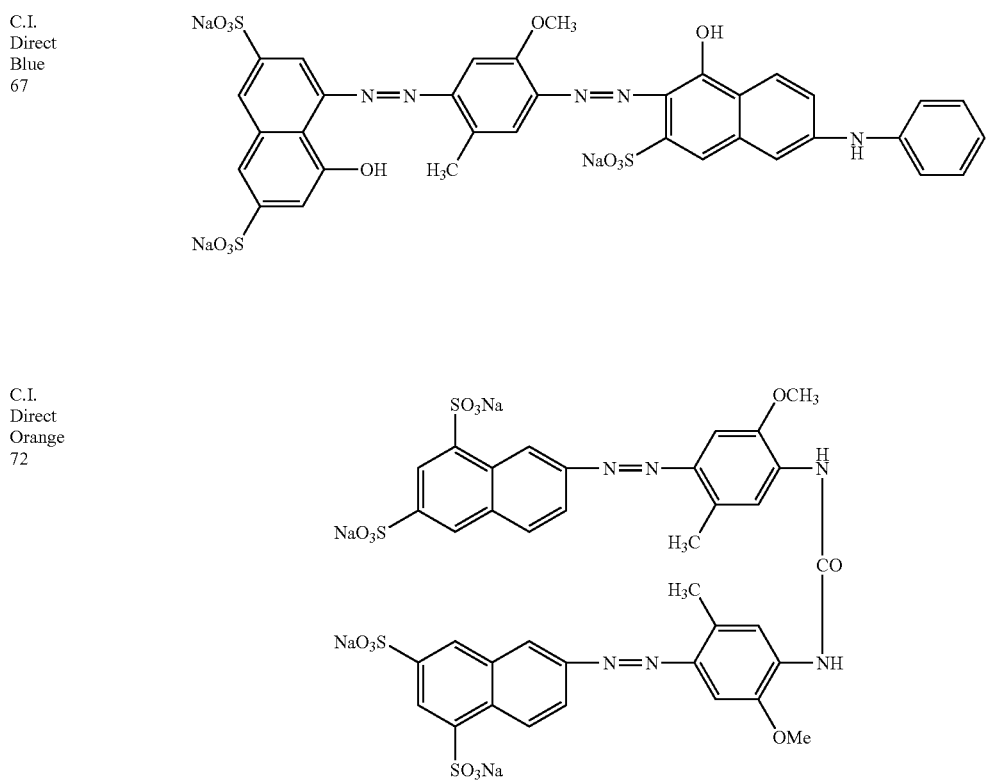

TABLE I-continued

| C.I. Direct Red 83 | (chemical structure) |
| C.I. Direct Green 59 | (chemical structure) |
| C.I. Direct Violet 48 | (chemical structure) |
| C.I. Acid Red 37 | (chemical structure) |
| CI Direct Yellow 34 | (chemical structure) |

TABLE I-continued

CI Direct Green 26

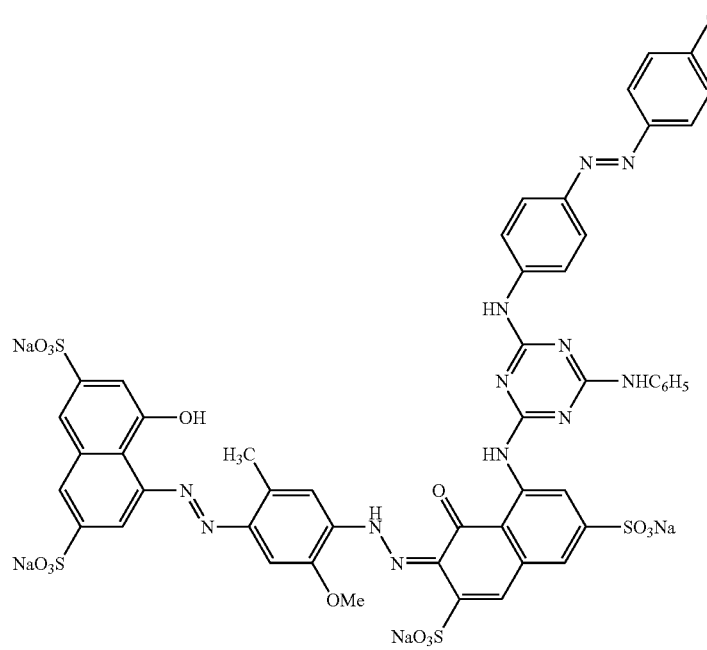

CI Direct Green 51

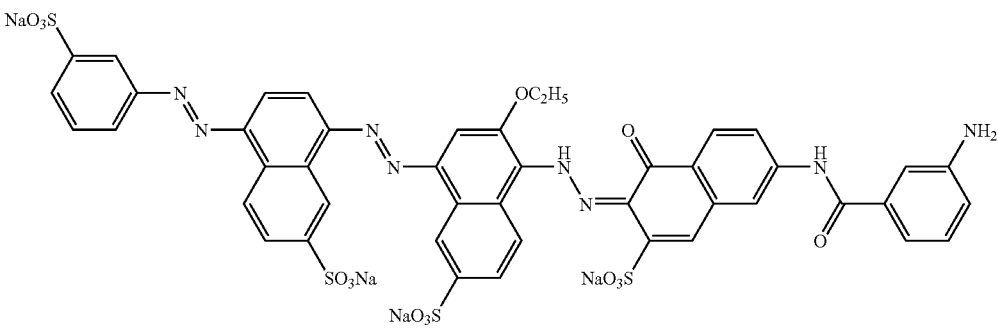

In addition to water, the polarizing dye molecules and the non-ionic surfactant molecules, the polarizing dye dispersion of the present invention may comprise: (i) other solvents such as alcohol if needed; (ii) other surfactants, such as an anionic surfactant, a cationic surfactant, an amphoteric surfactant, or mixtures and combinations thereof; (iii) adhesion promoting agents; (iv) plasticizers; (v) non-polarizing dyes for imparting a desirable color or hue to the end product, and the like, as long as these other ingredients (A) do not significantly negatively impact the adhesion of the light-polarizing layer to the other layers in the structure of the article, and (B) do not significantly negatively impact the polarizing effect of the polarizing dyes in the light-polarizing dye layer to be formed in the final light-polarizing product.

The polarizing dye dispersion of the present invention can be prepared in to various ways. One approach involves dissolving the polarizing dye molecules, the surfactant material and other components in a solvent to form a single dispersion. This approach can be advantageous if the thus produced dispersion would be used in a short period of time. According to certain embodiments, certain components of the dispersion, such as the polarizing dyes are dispersed in a solvent, such as water, to form a first dispersion, while other components such as the surfactant material is dispersed in the same or a differing solvent, to form a second dispersion, and the first and second dispersions are mixed together shortly before use. This two-step approach can be advantageous especially if the polarizing dye dispersion comprising all necessary ingredients are not sufficiently stable for prolonged storage and shipping, whereas the first and second dispersions are stable before they are mixed.

The present inventors have found that, in various embodiments of the present invention, the polyethylene glycol (PEG) based non-ionic surfactant having a general formula (I) with the features described supra is particularly advantageous for a high polarization efficiency and a low haze of the polarizing article including a layer of the polarizing dye formed from the polarizing dye dispersion of the present invention, presumably due to its higher capability to facilitate the self-alignment of the polarizing dye molecules either in the dye dispersion or after the deposition of the dye dispersion to the surface and the formation of the polarization dye layer.

A second aspect of the present invention is directed to a light-polarizing article comprising a first functional layer comprising a plurality of aligned polarizing dye molecules, characterized in that the first functional layer further comprises a non-ionic surfactant material comprising a plurality of surfactant molecules having the general formula (I) described supra in connection with the polarizing dye dispersion of the present invention.

Typically, in order to obtain a light-polarizing article for ophthalmic uses, and for many other uses, a second functional layer is needed over the light-polarizing layer, to impart desired physical and chemical properties to the final article. Such desired physical and chemical properties include: scratch resistance, water and/or stain-repelling properties, anti-fog properties, anti-reflective properties, and special tint or light filtering properties. Adhesion between such second functional layer and the light-polarizing layer, if such second layer is directly over and abutting the light-polarizing layer, is desired to be high throughout the life cycle of the article.

However, the present inventors have found that in certain embodiments the adhesion of polarizing dye layer and traditional anti-scratch coating materials is not as robust as desired. It has been found that prolonged exposure to light, high temperature, high humidity, water, saline, sweat, and combinations thereof, can weaken the bond between the light-polarizing layer and the second functional layer.

Without the intention or necessity to be bound by a particular theory, the present inventors believe that it is due to the ionic nature of the structure of the polarizing dye molecule and the non-ionic nature of the typical second functional layers or intermediate layers. Ions present on the molecular structure of the polarizing dye molecules, if not paired to immobilized counter ions, can attract moisture and water during the life cycle of the polarizing product in damp or wet conditions, causing erosion to the interface between the polarizing dye layer and the second functional layer.

Accordingly, to solve the problem of inadequate durability of the adhesion between the polarizing dye layer and the second functional layer, in certain embodiments of the present invention, it is beneficial to introduce, between the polarizing dye layer and the second functional layer, a layer of material having immobilized ions having charges, or capable of forming immobilized ions having charges, opposite to that of the polarizing dye molecules in the light-polarizing layer. The immobilized counter-ions would pair at least partly with the ions born by the polarizing dye molecules. As such, water penetration into the interface between the polarizing dye layer and the second functional layer would be reduced, inhibited or eliminated, thus the durability of the adhesion is improved.

Accordingly, in certain embodiments of the present invention, the light-polarizing article of the present invention comprises a first functional layer (i) (i.e., light-polarizing layer) comprising a plurality of light-polarizing molecules bearing ions thereon, and a second functional layer (ii) over the light-polarizing layer, wherein between the first functional layer (i) and the second functional layer (ii) and abutting the first functional layer (i), there exists a first coupling layer (iii) comprising a molecular structure bearing ionic groups having charges opposite to the polarizing dye molecules of the first functional layer, or groups capable of forming ions having charges opposite to the polarizing dye molecules of the first functional layer.

The article of the present invention may comprise a light-transmitting substrate on which the various functional layers and coupling layers are formed. The substrate may bear an optional inorganic adhesion layer on the surface to improve the adhesion of the first functional layer to the substrate. The light-transmitting substrate may take various shapes before the formation of the various layers described above. The substrate has at least one surface, which may be planar or contoured. The substrate may be a planar sheet, a cylindrical blank having various thickness, or, for ophthalmic products, a blank having at least one contoured surface, such as one concave surface, or one convex surface, or a convex and a concave surface. The first functional layer, the first coupling layer and the second functional layer are formed over at least part of the surface. It is not excluded that the substrate has more than one surface, and the various layers, if present, are formed over more than one of those surfaces. For example, the substrate may have two surfaces substantially parallel to each other, or substantially opposite to each other, and the inorganic adhesion layer and the polarizing dye layer are deposited over both surfaces. The polarizing direction of the two polarizing layers thus formed over the two surfaces may be chosen to be parallel or orthogonal to each other, or form a certain angle therebetween, depending on the use of the light-polarizing article of the present invention. Particularly, for an ophthalmic lens blank, it is desired that the side that will not be further processed downstream is allowed to form the light-polarizing layer thereon. For a prescription lens blank, that side usually is the concave side. For finished products, such as stock ophthalmic lenses and planar sun-glasses, the light-polarizing layer may be formed on either side, since usually no further surface grinding of the lens is required afterwards.

The light-transmitting substrate may have a main body made of inorganic glass or organic polymer, for example. As examples for such inorganic glass, mention can be made of typical alkaline earth aluminosilicate glasses, boroaluminosilicate (Pyrex®) glasses, doped and undoped fused silica glasses, transparent glass-ceramic materials, and crystalline materials, such as $CaF_2$, $MgF_2$, and the like. Particularly, for ophthalmic products, inorganic glass materials of special interest are those described in, for example, U.S. Pat. Nos. 4,839,314; 4,404,290 and 4,540,672. High refractive index inorganic glass materials disclosed in, for example, U.S. Pat. Nos. 4,742,028 and 6,121,176 are especially preferred.

Many polymer materials have been used as the substrate material for optical articles, including ophthalmic products. Such polymers may be polyamides, polyesters, polyimides, polysulfones, polycarbonates, polyurethanes, polyurethane-ureas, polyolefins, phenol resins, epoxy resins, and the like. As non-limiting examples of organic polymer suitable for the light-transmitting substrate, mention can be made of homopolymers and copolymers of polyol (allylcarbonate) monomers such as the diethylene glycol bis(allyl carbonate) sold under the trademark CR-39® by PPG Optical Products, homopolymers and copolymers of mono or poly-functional (meth)acrylate, cellulose acetate, cellulose triacetate, cellulose acetate butyrate, cellulose acetate propionate, polyvinyl (acetate), poly(vinyl alcohol), poly (vinyl chloride), polyurethanes, polyurethane-urea such as TRIVEX™ or NXT® sold by PPG Optical Products and Intercast Europe Spa, respectively, poly(thiourethanes), polyamides, polycarbonates such as those derived from bisphenol-A and phosgene sold under the trade mark LEXAN®, polyesters such as poly(ethylene terephtalate), polystyrene, copolymers of styrene and methyl methacrylate or acrylonitrile, cyclic polyolefin copolymers (COC), amorphous polyolefin such as Zeonex® from ZEON Corp., and the like.

The main body of the light-transmitting substrate may be photochromic or non-photochromic. Non-limiting examples of photochromic inorganic glass materials and preparation thereof are disclosed, for example, in U.S. Pat. Nos. 5,426,077 and 5,023,209. Non-limiting examples of photochromic polymer materials and preparation thereof are disclosed, for example, in U.S. Pat. Nos. 6,248,285 and 6,329,482.

The main body of the light-transmitting substrate may be colored or colorless. Colored inorganic glass materials and method of making the same are described extensively in the art. Colored polymer materials may be produced by adding, for example, various organic dyes into the monomer before polymerization, or by impregnating the polymer matrix using organic dyes.

The light-transmitting substrate may comprise, in addition to the main body, various layers of various types of surface coatings. For example, the substrate may bear an anti-reflective coating, a hardcoat typical for ophthalmic products, a photochromic coating, a tinted color coating, a UV filtering coating, an infrared absorbing coating, and the like. One skilled in the art is familiar with these coatings, especially in connection with the ophthalmic products. The first functional layers according to the present invention may be formed over these surface coatings, or may be formed over a surface differing from or opposite to the surface on which these coatings were formed.

The light-polarizing layer (e.g., first functional layer) is typically formed over at least part of at least one surface of the light-transmitting substrate. It imparts, at least partly, the light-polarizing property of the polarizing article of the present invention. The light-polarizing layer may comprise at least one light-polarizing dye, such as a dichroic dye, described supra, as the active ingredient. The dye molecules are oriented such that they impart the desired polarizing effect to the article of the present invention. However, in addition to the dye, the light-polarizing layer may further comprise other ingredients, such as adhesion promoting agents, plasticizers, non-polarizing dyes and surfactants, for imparting a desirable color or hue to the end product, and the like, as long as these other ingredients (i) do not significantly negatively impact the adhesion of the light-polarizing layer to the other layers in the structure of the article, and (ii) do not significantly negatively impact the polarizing effect of the dichroic dyes in the layer.

Light-polarizing dyes that can be used in various embodiments of the light-polarizing product of the present invention are described supra in connection with the polarizing dye dispersion of the present invention. In certain embodiments, the polarizing dyes are organic compounds having color-imparting groups. If the chains of the molecules are aligned in a certain direction by various means, such as by mechanical, electrical or magnetic means, the matrix of the molecules can preferentially allow light having electrical field in a given direction to pass, hence the polarizing effect.

In certain embodiments of the light-polarizing product of the present invention, at least part of the polarizing dye molecules in the first functional layer bear ionic groups on the molecular structure, as described supra in connection with the polarizing dye dispersion of the present invention.

In certain embodiments of the light-polarizing article of the present invention, the first functional layer desirably comprises a stabilizing component that at least partly immobilizes the light-polarizing dye molecules. The stabilizing component may or may not impart color or polarizing properties to the article. For example, where polarizing dye molecules bearing anions are used, a polysiloxane can be included in the light-polarizing layer. Properly cured polysiloxane, such as polyaminosiloxane and/or polyepoxysiloxane, have long polymer chains and/or cross-linked network that can partly immobilize the polarizing dye molecules. The present inventors have found that certain anion-bearing polarizing dyes, when in the form of $Al^{3+}$, $Mg^{2+}$ and $Ca^{2+}$ salt, have very low solubility in water at low temperature (such as around 0° C.). However, at higher temperature, such as around 100° C., or even under hot sun, prolonged exposure to humidity and/or liquid water (such as sweat) can mobilize a significant portion of the polarizing dye molecules if they are not secured by a polymer chain or molecule, causing reduction of polarization efficiency, haze, or even delamination. With additional polysiloxane polymer additives present in the first functional layer, the movement of the polarizing dye molecules can be significantly reduced, thus enhancing significantly the hot-water and sweat resistance of the polarizing dye layer.

It is desired in certain embodiments that the first functional layer is essentially a single layer, even if it comprises stabilizers such as polysiloxanes. By "essentially a single layer" is meant that when viewed on the sub-µm scale, the light polarization dye molecules are essentially evenly distributed throughout the layer. For a high polarization efficiency, such as a polarization efficiency higher than 95%, in certain embodiments higher than 98%, it is desired that the light-polarizing dye molecules are aligned in essentially the same direction.

In certain embodiments of the light-polarizing article of the present invention, it is desired that the first functional layer is formed in situ over a substrate, which may or may not comprise an inorganic adhesion surface layer described in detail below. In certain embodiments, it is desired that the substrate surface, such as the surface of the inorganic adhesion layer, comprises a plurality of microgrooves on the outer side (the side farther from the substrate), and the first functional layer is deposited in and over the microgrooves. In certain embodiments, it is desired that the microgrooves are substantially parallel to each other. The microgrooves are desired to have a sub-micron size in certain embodiments. That is, the width and depth of the grooves are desired to be less than 1 µm. The grooves serve to provide orientation of the polarizing dye molecules in the light-polarizing layer, according to the teaching of U.S. Pat. No. 2,400,877. Preferably, the light-polarizing layer comprises at least one dichroic dye capable of orienting themselves in the presence of microgrooves to provide light-polarizing effect. Such structure of polarizing dye on microgrooves was disclosed in FR 03 12686 and European patent application publication No. 1674898, and is particularly advantageous for the present invention. The structure is simple, easy to produce, and is capable of providing consistent polarizing effect across the surface without distorting the light manipulating power of the final article. In this structure, the polarizing dye molecules are desired to be stably confined in their local position under the normal use condition during the life cycle of the article. Compared to polarizing films and wafers, they are less likely to lose their orientation due to heat and other conditions. In other words, compared to prior art polarizing articles employing polarizing films and/or wafers, certain embodiments of the light-polarizing article of the present invention can be made to have higher thermal stability.

The light-polarizing article of certain embodiments of the present invention further comprises a second functional layer. The second functional layer can be, for example, a hard-coat layer (or anti-scratching layer), a water-resistant layer (anti-fog layer), an anti-reflective layer, a UV-absorbing layer, an IR-absorbing layer, a photochromic coating layer, and the like, and combinations thereof. The second functional layer may be based on various materials, such as organic polymers (e.g., poly(meth)acrylates, polyamides, polyimides, polyesters, polysulphones, polyurethanes, polyurethane-urea, and the like), polysiloxanes (e.g., polyepoxysiloxanes, polyethoxysilanes, polymethoxysilanes, and the like), inorganic materials (such as multiple layers of oxides of various metals for imparting the anti-reflective property to the article). The second functional layer may be further tinted. The second functional layer differs from the first functional layer in terms of, e.g., structure and/or composition.

As indicated above, the adhesion between an ionic group-bearing first functional layer and the second functional layer, absent a first coupling layer (iii) of the polarizing article of the present invention, tends to be insufficient, even if a stabilizer is included into the first functional layer to immobilize the polarizing dye molecules. It has been found by the present inventors that, upon exposure to high temperature and high humidity, or to artificial sweat or real sweat in simulated or real use conditions, polarizing articles without a first coupling layer between the first functional layer and the second functional layer, especially when the second functional layer is based on organic polymer materials, such as poly(meth)acrylates and/or polysiloxanes, the bonding between the first functional layer and the second functional layer tended to weaken.

Surprisingly, the present inventors have found that, in embodiments where the first functional layer comprises polarizing dye molecules bearing ionic groups thereon, by including a first coupling layer between the surfaces of the first functional layer and the second functional layer of the present invention, the adhesion between the first and second functional layers and durability thereof can be improved without sacrificing other desired properties of the article, such as polarization efficiency and the desired function of the second functional layer. In certain embodiments, the first coupling layer (iii) in the light-polarizing article advantageously has a structure that bears ionic groups having charges opposite to the polarizing dye molecules of the first functional layer, or groups capable of forming ions having charges opposite to the polarizing dye molecules of the first functional layer under use condition. Without intending to be bound by a particular theory, it is believed by the present inventors that the counter-ions borne on the structure of the first coupling layer can pair with the ions borne by the polarizing dye molecules in the first functional layer, form strong ionic bonds, further immobilize the polarizing dye molecules and enhance the bonding between the first functional layer and the first coupling layer (iii). The first coupling layer is desired to have certain structural units having physical properties similar to that of the second functional layer to allow a strong bonding between the first coupling layer (iii) and the second functional layer (ii). In certain embodiments, it is desired that: (a) the first coupling layer have a structure bearing groups that can react with the materials of the second functional layer (ii) to form strong and durable chemical bonds; or (b) the first coupling layer have a structure bearing groups capable of forming hydrogen bonds with the materials of the second functional layer (ii), such that there is a strong and durable adhesion between the first coupling layer (iii) and the second functional layer.

Thus, for example, where the polarizing dye molecules of the first functional layer (i) of the light-polarizing article of the present invention bear anions, such as —SO$_3^-$, —COO$^-$, and the like, it is desired that the first coupling layer (iii) comprises structure that bears cationic groups or groups that are capable of forming cationic groups under use conditions, and vice versa. In certain embodiments, the first coupling layer (iii) is desired to be a polysiloxane layer. Where the first coupling layer (iii) is desired to bear cationic groups, it may comprise the following interconnected structural units or protonated derivatives thereof:

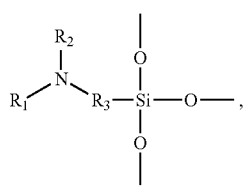
(a)

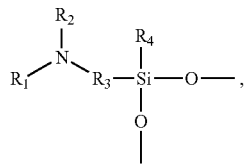
(b)

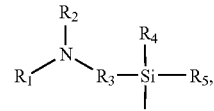
(c)

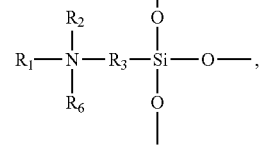
(d)

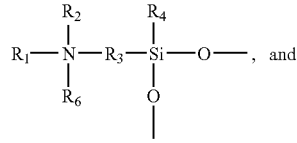
(e)

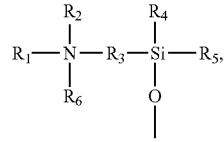
(f)

wherein:

$R_1$, identical or different at each occurrence, is independently selected from hydrogen, substituted and unsubstituted C1-C6 alkyl, substituted and unsubstituted C3-C7 cycloalkyl, substituted and unsubstituted phenyl,

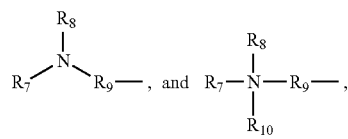

where $R_7$, $R_8$ and $R_{10}$, identical or different at each occurrence, are independently selected from substituted and unsubstituted C1-C6 alkyl, substituted and unsubstituted C3-C7 cycloalkyl and substituted and unsubstituted phenyl, and $R_9$, identical or different at each occurrence, is selected from substituted and unsubstituted C1-C6 alkylene, substituted and unsubstituted phenylene, and substituted and unsubstituted oxyalkylene, $R_2$, identical or different at each occurrence, is independently selected from hydrogen, substituted and unsubstituted C1-C6 alkyl, substituted and unsubstituted C3-C7 cycloalkyl and substituted and unsubstituted phenyl, $R_3$, identical or different at each occurrence, is independently selected from substituted and unsubstituted C1-C6 alkylene, $R_4$ and $R_5$, identical or different at each occurrence, are independently selected from substituted and unsubstituted C1-C6 alkyl, substituted and unsubstituted C1-C7 cycloalkyl and substituted and unsubstituted phenyl, and $R_6$, identical or different at each occurrence, is independently selected from substituted and unsubstituted C1-C6 alkyl, substituted and unsubstituted C1-C7 cycloalkyl and substituted and unsubstituted phenyl.

The above structural units may be present in a linear or cross-linked overall structure at various locations in various fashion, e.g., repeatedly and serially (as repeating units), or as end units, or as stand-alone structure in the middle of the network. The amine groups in the above structures are either cationic groups (in the case of quaternary amine group), or partly protonated under use condition (i.e., when formed into a polarizing layer in a light-polarizing article). Without intending to be bound by any particular theory, the present inventors believe that the OH groups present in the polysiloxane structure can react with the primary amine groups, secondary amine groups, and tertiary groups to form corresponding protonated amine groups under use conditions.

In certain embodiments, the first coupling layer (iii) comprises polymers of: γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, and mixtures and combinations thereof.

In certain embodiments of the light-polarizing article of the present invention, the first coupling layer, if present, desirably has a thickness of less than 1 µm, in certain embodiments from 5 nm to 500 nm, in certain other embodiments from 5 nm to 200 nm, in certain other embodiments from 5 nm to 100 nm, in certain other embodiments from 5 nm and 50 nm.

In order to optimize the adhesion between the first coupling layer (iii) and the second functional layer in the light-polarizing article of the present invention, it is desired, in certain embodiments, there exists a second coupling layer between the first coupling layer and the second functional layer. Such second coupling layer can comprise, e.g., polyepoxysiloxane, poly(meth)acryloxysiloxane, and the like.

In the light-polarizing article of the present invention, it is desired that there exists at least one inorganic adhesion layer on the surface of the light-transmitting substrate, on which the first functional layer (the light-polarizing layer) is located, as described supra. As described in European patent application publication No. 1674898, although in certain embodiments of the light-polarizing articles of the present invention the light-polarizing dyes are organic in nature, their bonding to an inorganic adhesion layer which forms part of the surface of the substrate, described in detail below and in European patent application publication No. 1674898, tends to be much stronger than to a polymer intermediate layer as disclosed in FR 03 12686. In addition, the inorganic adhesion layer, with the assistance of an optional inorganic sub-layer, tends to have a strong bond with most substrate materials, including inorganic glass substrates and organic polymer substrates (which may comprise further surface layers on which the inorganic adhesion layer and optional sub-layer are formed, as described below).

The inorganic adhesion layer is desired to be an oxide of silicon, a metal oxide or a compatible mixture and/or combination thereof. Desirably, the inorganic adhesion layer is formed by a material selected from: SiO, $SiO_2$, $Al_2O_3$, $ZrO_2$, $TiO_2$, $GeO_2$, and mixtures and combinations thereof. In certain embodiments, the inorganic adhesion layer is formed of $SiO_2$. The present inventors have discovered that, the inorganic adhesion layer, especially if formed of $SiO_2$, can be formed with a strong bond with substrates made of inorganic glass materials and organic polymer materials, with or without additional surface coatings. Generally, the inorganic adhesion layer should have the desired light-transmitting properties at the wavelength range in which the polarizing article is to be used. It is also contemplated that multiple layer of inorganic materials having differing compositions may be employed as the inorganic adhesion layer. Such multiple layer structure may be advantageously employed to reduce reflection at the interface between the inorganic adhesion layer and the substrate.

The thickness of the inorganic adhesion layer, if present, is on the microscopic scale. The thickness of the intermediate layer should be sufficient to allow the formation of the microgrooves without revealing the substrate surface. In certain embodiments of the light-polarizing article of the present invention the inorganic adhesion layer has a thickness less than 10 µm, in certain embodiments less than 5 µm, in certain other embodiments less than 1 µm. Generally, for plasma deposition, the thinner the coating, the less time is required for the deposition thereof.

For certain substrates, in order to obtain a strong adhesion between the inorganic adhesion layer and the substrate material, it is desired to form a thin inorganic sub-layer between the inorganic adhesion layer and the substrate. The sub-layer has a composition differing from that of the inorganic adhesion layer. The sub-layer is typically formed of silicon, an elemental metal, a metal oxide or an oxide of silicon. As non-limiting examples of elemental metals, mention can be made of chromium, molybdenum, nickel, titanium, iron and compatible combinations and/or mixtures thereof. As non-limiting examples of metal oxides, mention can be made of $Al_2O_3$, $ZrO_2$, $TiO_2$, $GeO_2$, and mixtures and combinations thereof. Silicon oxide may be SiO and/or $SiO_2$. In certain embodiments, desired sub-layer materials are chromium metal and SiO, especially for a $SiO_2$ intermediate layer.

The sub-layer is generally much thinner than the inorganic adhesion layer, usually on the nano-scale. Where the sub-layer is formed of an elemental metal, such as chromium, in order to ensure sufficient transmission, it is highly desired that the thickness thereof be very low. Typically, the sub-layer has a thickness of less than 300 nm, in certain embodiments less than 100 nm, in certain other embodiments less than 20 nm. The inorganic sub-layer may be a single layer of atoms or molecules.

As non-limiting examples of a combination of the inorganic adhesion layer and the sub-layer, mention can be made of: (i) a sub-layer of SiO and a $SiO_2$ intermediate layer; and (ii) a sub-layer of chromium metal and a $SiO_2$ intermediate layer. The combination of SiO sub-layer and $SiO_2$ intermediate layer is believed to be particularly effective for substrates made of CR 39 (a thermosetting synthetic resin of diethylene glycol bisallyl carbonate) substrate. The monomer for this polymer has the following structure:

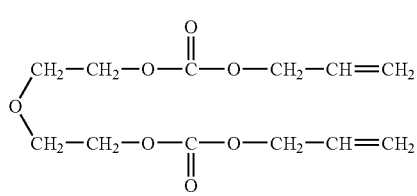 [SMILES: C=CCOC(=O)OCCOCCOC(=O)OCC=C]

Various polarizing articles according to certain embodiments of the present invention can be produced for use at wide spectra of wavelength, ranging from UV to visible light, to infrared light. In certain embodiments, especially for the ophthalmic applications, the light-polarizing article of the present invention is for use in visible light wavelength range.

The light-polarizing article of the present invention may find application in many devices. Non-limiting examples of applications include: ophthalmic products; display products, particularly liquid crystal displays, including LCD monitors and LCD projectors; polarizing windows for vehicles, including land-based, air-born and water-based vehicles; facemasks; shields; building glass; and the like.

In general terms, the process of the present invention for the production of light-polarizing article comprises the following steps:

(A) providing a light-transmitting substrate having at least one surface;

(B) forming a plurality of micro-grooves on the surface of the substrate;

(C) coating the surface having micro-grooves with the polarizing dye dispersion described supra; and (D) forming a polarizing dye layer on the surface.

In certain embodiments of the present invention, the process further comprises the following step (F):

(F) forming a second functional layer over the light-polarizing layer;

In certain embodiments of the process of the present invention, the process further comprises the following step (E) between steps (D) and (F):

(E) forming a first coupling layer on the light-polarizing layer. In certain embodiments of the process of the present invention, especially those which involves using a polarizing dye dispersion comprising a polarizing dye having ionic groups on its molecular structure, said first coupling layer comprises molecular structure bearing ionic groups having charges opposite to the polarizing dye molecules of the light-polarizing layer, or groups capable of forming ions having charges opposite to the polarizing dye molecules of the light-polarizing layer.

As described in European Patent Application Publication No. 1674898, in order to obtain strong adhesion between the light-transmitting substrate and the light-polarizing layer, it is desired that step (A) comprises the following sub-step (A2):

(A2) depositing an inorganic intermediate adhesion layer on the surface of the substrate;

and step (B) comprises forming a plurality of micro-grooves on the surface of the inorganic intermediate adhesion layer.

As discussed above, for certain substrate materials, it is desirable to add an inorganic sub-layer between the inorganic adhesion layer and the substrate in order to promote the adhesion between the inorganic adhesion layer and the substrate. Accordingly, those embodiments of the process of the present invention for the production of those articles further comprises an additional step (A1) prior to step (A2):

(A1) forming at least one adhesion-promoting inorganic sub-layer different from the inorganic adhesion layer between the substrate and the inorganic adhesion layer;

wherein in step (A2), the inorganic adhesion layer is formed directly over and abuts the inorganic sub-layer formed in step (A1).

In step (A), the substrate may have the structure and composition as discussed above in connection with the light-polarizing article of the present invention. Generally speaking, such substrates may be surface polished, cleaned and dried before step (A1) and/or (A2), if present, and step (B). Various surface cleaning techniques may be used. Sometimes, in order to activate the surface for better adhering between the surface and the respective layers to be deposited, it is desirable to use plasma cleaning.

In addition, as part of step (A), surface coating may be applied or pre-applied to the body of the substrate. Such surface coating may include, for example, antireflective coatings, hardcoats, and the like. However, since the inorganic adhesion-promoting layer and the inorganic sub-layer can be chosen to suit the needs of various types of substrate materials, deposition of those coatings are not compulsory. It is indeed oftentimes preferable not to form those base coatings in order to minimize the steps of production process. That said, the application of such addition surface coatings to the body of the substrate may be desirable for certain substrate materials, especially those made of organic polymer materials. In a totally non-limiting way, the surface coating may be notably based on silanes, e.g., alkoxysilanes and/or chlorosilanes or compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the above types, which are non-reactive with each other (e.g., isocyanate and vinyl). Particular examples of such surface coating include coatings based on γ-aminopropyltrimethoxysilane, γ-aminopropyltriethoxysilane and epoxyalkyltrialkoxysilane.

Regarding steps (A1) and (A2), the inorganic adhesion layer and the inorganic sub-layer may be obtained using a technique such as, e.g., chemical vapor deposition (CVD) processes, such as plasma enhanced chemical vapor deposition (PECVD), low pressure chemical vapor deposition (LPCVD), sub-atmospheric chemical vapor deposition (SACVD); plasma vapor deposition (PVD) processes, such as ion-assisted electron beam evaporation, non ion-assisted electron beam evaporation and sputtering; as well as sol-gel processes, and the like, can be used.

Chemical vapor deposition (CVD) is a widely used materials-processing technology. A good reference book on CVD is *Chemical Vapor Deposition* (Eds. J-H Park et al.), *Surface Engineering Series*, Volume 2 (ASM International®, July 2001). The majority of its applications involve applying solid thin-film coatings to surfaces. Stated simply, CVD involves flowing a precursor gas or gases into a chamber containing one or more heated objects to be coated. Chemical reactions occur on and near the hot surfaces, resulting in the deposition of a thin film on the surface. By-products along with unreacted precursor gases are exhausted out of the chamber. PECVD, LPCVD and SACVD are only a few variants of CVD techniques. CVD can be carried out at a wide range of temperature and pressure, with or without carrier gases. The majority of the elements in the periodic table have been deposited by CVD techniques, some in the form of the pure element, but more often combined to form compounds.

Among these CVD processes, PECVD is a preferred process for depositing the inorganic adhesion layer and the sub-layer, if present, in the process of the present invention. In a PECVD system, a RF source excites electrons in an electromagnetic field set up between a top electrode and a grounded substrate. The excited electrons collide with gas molecules to form ions/reactive neutrals or plasma. PECVD has several advantages over thermal CVD techniques. First, PECVD allows for a much lower deposition temperature and pressure. For example, the temperature for PECVD deposition of $SiO_2$ using $SiH_4$ and $O_2$ or $N_2O$ is typically from 200 to 400° C., in contrast to the 350-550° C. temperature required for thermal CVD. Second, by using a plasma, ion bombardment aides in making films denser, increases deposition rate, and promotes good film adhesion. Moreover, film uniformity in terms of microstructure and thickness can be achieved. Still another great advantage of PECVD is its ability in controlling residual film stress. By varying process parameters, the user can create films with compressive or tensile stress or without stress.

The plasma vapor deposition techniques do not involve a chemical reaction between the substrate surface and the material being deposited onto it. In the evaporation methods, the material to be deposited is heated in a vacuum until it boils or sublimes to become a gas. The gas is transported to the substrate, where it is cooled and condenses onto the substrate surface to form the deposited layer. In sputtering, the material to be deposited is literally thrown at the substrate at a high velocity. A wide variety of sputtering techniques have been developed. Thin films of many materials, including silicon dioxide, have been deposited using evaporation or sputtering techniques.

Sol-gel process for thin film formation involves the coating of a sol-gel of the material being deposited onto the surface of the substrate, followed by drying and heat treatment to form a dense interconnected film of the deposited material. In the case of silica, for example, a sol-gel material can be created by hydrolysis (acidic or alkaline or in neutral pH) of alkoxysilanes. The thus formed colloidal sol-gel is coated onto the substrate surface, dried and heat treated below 300° C. to form a dense coating. A higher temperature heat treatment may be used to sinter the film for a higher densification, if permitted, for example, where the substrate is based on an inorganic glass.

Spray pyrolysis is another option for depositing the inorganic adhesion layer and the optional sub-layer.

Whatever coating deposition process is used, it is desired that the coating deposition process does not adversely affect the composition and property of the substrate. For example, if the substrate comprises organic polymer material that deforms or degrades at a high temperature, the deposition of the inorganic adhesion layer and the optional sub-layer must be conducted below a threshold temperature. It is desirable that the deposited coating have strong adhesion to the substrate and other coatings.

Thus, particularly preferred techniques are those based on ion assisted deposition (IAD), ion beam sputtering (IBS), plasma ions assisted deposition (PIAD) because they operate at near room temperature. IAD process for example produces coating with good physical properties but also can be applied to heat sensitive substrates such as plastics because the low temperature involved. This process results in direct deposition of ionized vapor and in adding activation energy by the highly effective ion bombardment during the growing of the film. In PIAD, various materials are evaporated using electron guns in conjunction with a plasma source.

Another example of vacuum deposition is described in U.S. Pat. No. 4,130,672. Indeed this patent relates to a method capable of coating silicon oxide SiO and silicon dioxide $SiO_2$ film on the surface of transparent optical material of glass or synthetic resin at low temperature (lower than 120°). This method utilizes the fact that silicon oxide is easily vacuum-deposited even at low temperature (100° C.). Using the appropriate condition of vacuum-deposition a durable coating can be easily obtained which comprises a SiO and a $SiO_2$ layers. Moreover the coating obtained exhibits a pencil hardness of 6-7H which is twice as large as that of synthetic substrate such as CR39® and therefore well suited to be grooved by means of an abrasive brushing.

Although SiO has good adhesion on plastic substrates even when directly deposited on the substrate at a high thickness it suffers optically undesirable absorption. Therefore SiO is used primarily for the purpose of ensuring adhesion of a thicker $SiO_2$ layer.

U.S. Pat. No. 5,597,622 mentioned that if an $SiO_2$ layer is applied directly it adheres poorly on synthetic substrates. Such coating applied directly becomes very rapidly detached in boiling water tests for example after 5 to 10 minutes. In contrast, if SiO is used as an adhesion layer between the substrate and the $SiO_2$ layer the article passes the boiling tests.

When SiO plus $SiO_2$ are used together the relative thicknesses may need to be adjusted in order to avoid detrimental reflection effect.

Despite its undesirable absorption, SiO may be used as the inorganic adhesion layer, provided that the thickness is chosen in order that the absorption is kept within reasonable limit. Generally SiO layer has thicknesses from one molecule up to 100 nm. Preferably the thickness is up to 50 nm.

$SiO_2$ may be used in higher thickness, for example, up to 500 nm. We have found that an appropriate thickness for the article of the invention is 100 nm, for example.

As mentioned above, the body of the substrate may be surface treated before the application of the inorganic adhesion layer and the optional inorganic sub-layer. For example, for certain plastic substrate materials, in order to obtain a good adhesion, it is also possible to form a silicone resin type curable hard layer on the surface prior to the deposition of the inorganic adhesion layer and the optional inorganic sub-layer. These silicone hard resins can be used as anti-scratch coatings. Example of such a deposition of silicone resin layer prior to vapor deposition of $SiO_2$ is described in JP 58042001. We have found that silicone resin sold under the trade mark HI-GARD® 1080 from PPG Industries, Inc. is particularly suitable and provides an acceptable adhesion and a good transmittance.

Such a silicone resin layer may be also needed to ensure a good resistance of the substrate to the highly energetic conditions that are involved when ion or plasma assisted techniques are used. A general rule is that lenses without hardcoat may be coated with metal oxide layer without ion assist, but substrates with hardcoats may be generally hard coated with ion or plasma assist. This is particularly useful with synthetic substrates that have poor thermal stability.

Very thin metallic layer (such as chromium) can be used in order to obtain a higher adhesion of the oxide layer on the substrate. Indeed oxides normally do not normally adhere strongly to plastics. Being a metal, this layer must be extremely thin to prevent a grey color. Typical adhesion metal sub-layer thicknesses are only a few nanometers.

Methods and equipment for forming microgrooves and deposition of the light-polarizing layer thereon have been disclosed in FR 03 12686, U.S. Pat. Nos. 4,683,153 and 2,400,877.

The formation of micro-grooves on the surface of the inorganic adhesion layer is advantageously achieved by brushing the surface. As a non-limiting example, a spinning wheel made of foam material, such as polyurethane form, soaked with a slurry of abrasive particles, can be used for brushing the surface. The slurry of the abrasive particles may be typical polishing slurry used in the art known to one of ordinary skill. The abrasive particles usually are on microscopic and submicron scale. The particles may be of, for example, $Al_2O_3$, $ZrO_2$, $TiO_2$, $CeO_2$, and the like, as long as they have higher hardness than the surface to be abraded, such as the inorganic adhesion layer or the bulk material of the substrate per se, as the case may be. Additives, such as viscosity modifying agents, may be added into the slurry as well. One of ordinary skill in the art can adjust the rotation speed of the brushing wheel, the pressure applied, and other process parameters, when brushing to obtain an optimized brushing result in an optimized brushing time.

Upon brushing of the intermediate layer, prior to the deposition of the light-polarizing layer, the substrate is usually thoroughly cleaned and dried.

The formation of the light-polarizing layer involves coating a polarizing dye dispersion of the present invention as described supra onto the surface such as the surface of an inorganic adhesion-promoting layer, on which micro-grooves have already been formed. The deposition of the polarizing dye solution can be performed by using various coating techniques available in the art such as, for example, dip coating, flow coating, spin coating, spray coating, and the like, using conventional equipment.

After coating the polarizing dye dispersion over the micro-grooved surface, it is often desirable to insolubilize and immobilize the polarizing dyes on the microgrooves. Thus, step (D) of the process of the present invention can comprises a sub-step of insolubilizing the polarizing dye molecules coated on the surface. A preferred way to do so is to subject the coated substrate to an aqueous solution of a metal salt. U.S. Pat. No. 2,400,877 discloses methods and agents used for the insolubilization. As non-limiting examples of such metal salts, mention can be made of $AlCl_3$, $BaCl_2$, $CdCl_2$, $ZnCl_2$, $SnCl_2$, and the like. $AlCl_3$ and $ZnCl_2$ are preferred for their low toxicity. Other salts than chlorides may be used. Generally, metal salts used in textile industry for insolubilizing dyes in water can be used. For example, metal salts of Al, Fe, Cr, Ca, Mg, and the like, may be used. In addition, the material for insolubilizing the dye molecules may be a buffered solution or dispersion containing multiple acids, salts and/or bases of various metals. For example, one combination used for insolubilizing certain sulphonic group-bearing polarizing molecules is an aqueous dispersion including: (i) $AlCl_3$, (ii) $Mg(OH)_2$, and (iii) $Ca(OH)_2$, at a pH of about 4. The result of such insolubilization by metal salts is the precipitation of the polarizing dye molecules in the form of salts having low solubility in water around room temperature.

However, as indicated above, such precipitated salts may still have an unacceptable solubility in water at a relatively high temperature, or may be mobilized after prolonged exposure to sweat and/or other water source. In certain embodiments of the present invention, step (D) further comprises, after insolubilizing the polarizing dye molecules, a sub-step of further immobilizing the polarizing dye molecules in the polarizing dye layer. Thus, in certain embodiments, it is desired that the polarizing dye molecules are further immobilized by, e.g., polymer molecules distributed in the light-polarizing layer. One category of polymers that can be used for this purpose is polysiloxane. According to certain embodiments, after the initial insolubilization of the polarizing dye molecules, the layer of polarizing dye molecules is impregnated with a dispersion of a siloxane or prepolymer of at least one siloxane. It is generally desired that the siloxane or siloxane prepolymer is allowed to penetrate into and distribute throughout the light-polarizing layer. In certain embodiments, it is desired that the impregnation is at least 5 minutes, in certain embodiments at least 10 minutes, in certain embodiments at least 15 minutes. Upon impregnation, it is desired in certain embodiments that the light-polarizing layer is rinsed to avoid the formation of a separate layer of the siloxane and/or prepolymers thereof on the surface. Without intending to be bound by any particular theory, it is believed that this could avoid the disorientation of the polarizing dye molecules caused by the further polymerization of any separate layer of siloxane. Upon impregnation and rinsing, it is desired in certain embodiments that the light-polarizing layer is subjected to mild heat treatment by which the siloxane and/or prepolymer thereof distributed within the light-polarizing layer are allowed to polymerize and/or crosslink, forming a polymer matrix which traps the light-polarizing dye molecules.

In order to obtain a high polarizing efficiency of the article, it is desired that the polarizing dyes, with or without the aid of additives such as liquid crystal polymers, align in a parallel matter, such as in the direction of the micro-grooves. It is desired that, in certain embodiments, that the light-polarizing layer is essentially a single layer. This would allow for precise alignment of the polarizing dye molecules and thus a high polarization efficiency.

As discussed supra, in order to improve the adhesion and the durability thereof under use conditions between the light-polarizing layer and the additional functional layer over it, such as protective coatings, certain embodiments of the process of the present invention may include a step of forming a first coupling layer between the light-polarizing layer and the additional functional layer. The first coupling layer was found to be beneficial for improving adhesion between light polarization layer comprising anion-bearing polarizing dye molecules and protective coatings comprising polysiloxane and/or poly(meth)acrylates.

As discussed supra, the first coupling layer, if present, can have a structure bearing ionic groups having charges opposite to the polarizing dye molecules of the light-polarizing layer, or groups capable of forming ions having charges opposite to the polarizing dye molecules of the light-polarizing layer under use conditions. The counter-ions of the light-polarizing dye molecules and the first coupling layer form strong bonds, improving the adhesion between the light-polarizing layer and the first coupling layer. In addition, where the light-polarizing layer comprises polymer immobilizers, such as polysiloxane, the first coupling layer is desired to react with the polymer immobilizers to form covalent bonds, thus building a network of molecular structure at the interface between the light-polarizing layer and the first coupling layer, further enhancing the adhesion between the two layers, and immobilizing the polarizing dye molecules, especially those located at or close to the interface.

Therefore, for light-polarizing dye molecules bearing anion groups, such as sulphonic groups, the first coupling layer has a structure bearing cationic groups or groups capable of forming cationic groups under use conditions. The first intermediate layer can be advantageously based on polysiloxane comprising structures (a), (b), (c), (d), (e) and (f) described above in connection with the light-polarizing article of the present invention.

Such polysiloxane layers can be formed by processes known to one having ordinary skill in the art. Generally, in those embodiments, siloxanes or silanes having the desired molecular structure are allowed to hydrolyze in an aqueous media, with or without various basic or acidic catalysts, with or without pre-condensation, then applied to the targeted surface by, e.g., dipping, spraying, spin coating, flow coating, and the like. The coating is allowed to dry, and sometimes heated to an elevated temperature where they further undergo polymerization (by condensation, for example), to obtain a robust coating layer. Thus step (D) of the process according to certain embodiments of the present invention can comprise a sub-step of evaporating at least part of the solvent from the coated polarizing dye dispersion.

The light-polarizing article of the present invention can be made robust enough to withstand the wear and tear of the typical intended use of the final light-polarizing article, such as an ophthalmic lens, which could be subjected to widely fluctuating temperature, high humidity, direct sunlight, and possibly rain and sweat. In many situations, a further protective coating above the light-polarizing coating is usually desirable. Thus, in certain embodiments of the process of the present invention, a further step (F) is carried out to form a further protective layer over the light-polarizing layer. As discussed supra, in order to optimize the adhesion between the first coupling layer and the protective layer, in certain embodiments, it is desired that a second coupling layer is formed above the first coupling layer prior to the formation of the protective layer. The second coupling layer differs from the first coupling layer in terms of structure and/or composition. Typically, the second coupling layer is desired to have a structure essentially free of ions. It is further desired that the second coupling layer can react with the first coupling layer at the interface to form covalent bonds and/or hydrogen bonds to achieve a high bonding strength between them. For example, where the first coupling layer comprises polysiloxane, the second coupling layer may be based on a differing polysiloxane. During the curing step, it is desired that the surface groups of both layers (such as —OH groups) undergo reactions (such as condensation) to form covalent bonds (such as —Si—O—Si— linkages), whereby a strong network is formed at the interface. A particularly useful category of material for the second coupling layer is based on polyepoxysiloxane, especially if the first coupling layer is based on cation-bearing polysiloxane.

Similar to the surface coating on the substrate, described above, the protective coating formed in step (F) may be notably polysiloxanes based on silanes, e.g., alkoxysilanes and/or chlorosilanes, or compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the above types, which are non-reactive with each other (e.g., isocyanate and vinyl). Particular examples of such surface coating include coatings based on γ-aminopropyltrimethoxysilane, γ-aminopropyltriethoxysilane and epoxyalkyltrialkoxysilane. These protective layers may be tintable (thus tinted or non-tinted) or non-tintable, depending on the application of the final polarizing article. Non-limiting examples of commercially available coating compositions for such protective layer include: UV cured coatings obtained from UV curable resin such as C4000-60, C5050-60 which are non-tintable, C5051-60 which is tintable and CRC-12 from LESCO, SCH 180, SHC 3100 and SHC Armour 500 from Lens Technology, LLC; thermally cured coatings such as those obtained from the two-component hard coating solution sold under the name TS56H or TS56 T from Tokuyama Corp. which are non-tintable and tintable respectively, or from the one-component HI-GARD® 1080 or HI-GARD® 1035 coating solution from PPG industries, Inc.

Over the protective coating, additional optional coatings may be formed. These coatings include, but are not limited to, hydrophobic (water-repellent or anti-fog) coatings; infrared absorbing coatings; UV absorbing coatings; anti-reflective coatings; photochromic coatings; cushion coatings (shock-absorbing flexible coatings); and the like. These coatings may also be formed on the side of the substrate opposite to the inorganic adhesion layer, the optional sub-layer and the light-polarizing layer.

FIG. 1 schematically illustrates one embodiment of the process according to the present invention. However, this process does not include a step of forming the first coupling layer (iii). Thus, the end light-polarizing article as illustrated in this figure does not have the first coupling layer (iii) between the light-polarizing layer and the protective layer. In step (1), a substrate main body 101 is provided. In step (2), a hardcoat surface coating 103 is formed over one surface of the substrate main body 101. In step (3), an inorganic sub-layer 105 is formed on the top of the surface layer 103. In step (4), an inorganic adhesion layer 107 is formed on the top of the sub-layer 105. The combination of 101, 103, 105 and 107 thus forms the substrate 100 in the meaning of the present application. In step (5), the inorganic adhesion layer 107 is brushed to form a plurality of substantially parallel micro-grooves 109 on its top surface. In step (6), a polarizing layer 111 is deposited on the top of the microgrooves 109. In step (6), a polarizing dye dispersion according to the present invention is applied to the surface having a plurality of micro-grooves, insolubilized, optionally immobilized, and dried. In step (7), a protective layer 113 is formed on the top of the light-polarizing layer 109.

Figure 2:
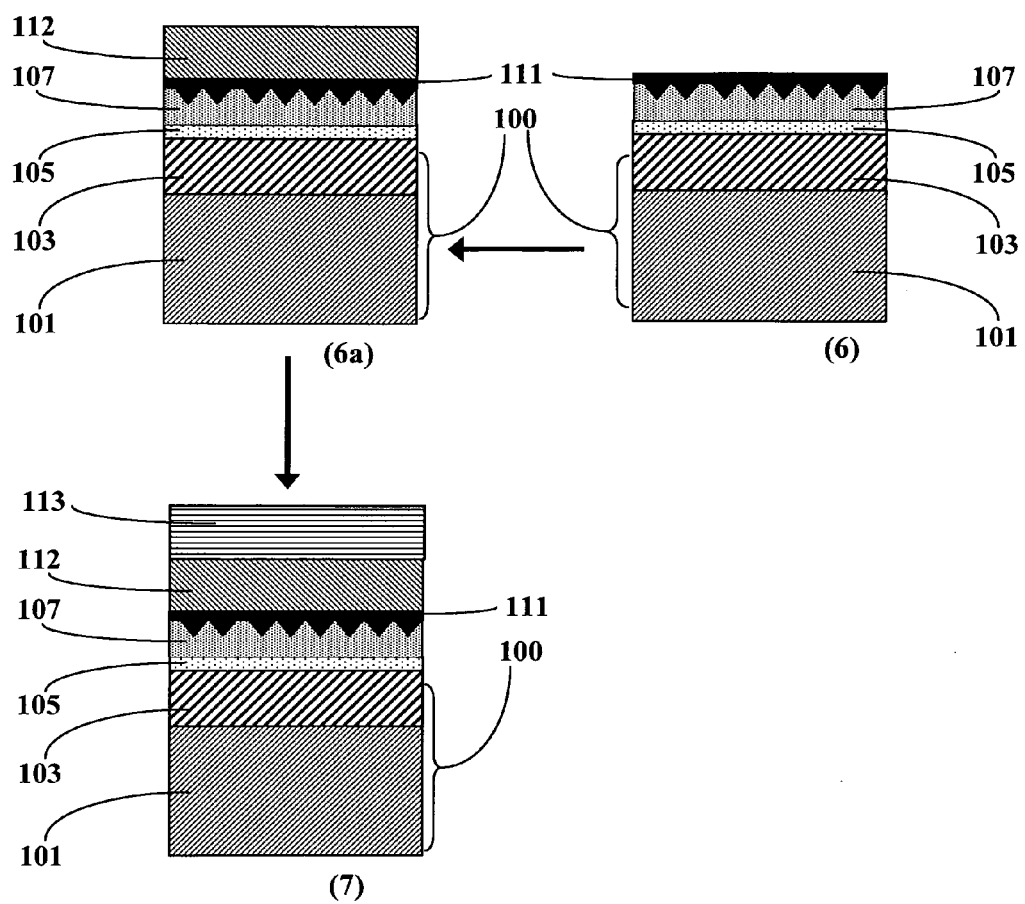
FIG. 2 is a schematic illustration of the structure and manufacture process thereof of another embodiment of the light polarizing article of the present invention.

FIG. 2 illustrates part of another embodiment of the process of the present invention. This embodiment shares the steps (1)-(5) of the process as illustrated in FIG. 1. Therefore, steps (1)-(5) are not shown in FIG. 2. The major distinction between the embodiment of FIG. 2 from the process of FIG. 1 is the inclusion of step (6a) between steps (6) and (7), in which a first coupling layer 112 is formed. As is clear from the above description of the present invention, FIG. 2 is merely an illustration of one embodiment of the present invention. Some of the steps illustrated in FIG. 2 may not be required in the production of certain polarizing articles of the present invention. For example, steps (2) and (3) may be omitted for certain substrate materials.

As mentioned above, the process of the present invention may be applied for many different types of inorganic and organic substrate materials. The same inorganic adhesion layer, such as $SiO_2$, may be deposited on those different substrate materials to obtain similarly good results. Therefore, for different substrate materials, down-stream process steps (C) and (D) and (E) may be performed by using the same process parameters and equipment. This translates to consistency of product quality, higher production yield and lower production cost. The durability of the article in certain embodiments is particularly high especially in high humidity or boiling tests. Further, the process of the present invention allows the articles of the present invention to be produced in individual small-scale ophthalmic prescription laboratories with relatively low cost.

The following non-limiting examples further illustrate the present invention.

EXAMPLES

In all examples, the lenses prepared were subjected to optical performance tests below:

Polarization efficiency ($P_{eff}$) was determined by measuring the parallel transmittance ($T_{\parallel}$) and perpendicular transmittance ($T_{\perp}$) using a visible spectrophotometer and a polarizer. The Polarization efficiency was calculated using the following formula:

$$P_{eff} \% = \frac{T_{\parallel} - T_{\perp}}{T_{\parallel} + T_{\perp}} \times 100\%$$

Haze (%) was determined using a haze-meter (Haze-Gard plus from BYK Gardner).

The convex side of a lens substrate (plastic lens coated with a silica layer) is rubbed using a spherical polyether foam soaked by a water based alumina slurry. The lens was then carefully rinsed with deionized water.

Activator compositions listed in TABLE III below, which are aqueous solutions of commercially available surfactant materials A, B, C, D and E having structural parameters listed in TABLE II below, were prepared and tested for their performances. Each activator was added as a 10 wt % solution in water to an aqueous dye solution comprising a mixture of three azoic dyes, available as Varilight 2S® from Sterling Optics, Kentucky, U.S.A. The resultant polarizing dye dispersion was spin-coated on the brushed convex side of the lens substrates. The drying of the dye solution was controlled by the spinning speed, the temperature and humidity in the deposition chamber. After dye deposition, haze and polarization efficiency were measured as described above.

In order to protect the water soluble dye layer, the coated lens substrates were dipped in a stabilizing solution (aluminum chloride solution in water) and then rinsed in deionized water. The lens substrates were then dipped in a water based solution of 3-aminopropyltriethoxysilane at 10% by weight for 15 minutes, then rinsed in deionized water, dried and heat cured. After silane treatment and curing, the haze and polarization efficiency were measured. Test results of the polarizing dye dispersion containing individual actuator are presented in TABLE III below as well. AC1 is a comparative example in that the average of the number n of the surfactant molecules is 8.

As shown in TABLE III, higher polarization efficiencies, above 99%, and lower haze, were found using activator compositions comprising either C or B as the non-ionic surfactant. The polarization efficiency was further improved to up to 99.8% using mixtures of C and B while keeping a low haze. Surprisingly, using mixtures of these surfactants, the polarization efficiency loss and haze were dramatically decreased after addition of the protection layer by treatment with aminopropyltriethoxysilane. The polarization efficiency remained above 99%. Further, it is clear that the polarizing dye dispersions utilizing actuators having an average of the number n higher than or equal to 9 performed better than comparative polarizing dye dispersion utilizing the comparative actuator AC1.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

The invention claimed is:

1. An aqueous polarizing dye dispersion comprising a plurality of polarizing dyes and a plurality of non-ionic surfactants, each of the surfactants having a molecular structure represented by the following general formula (I):

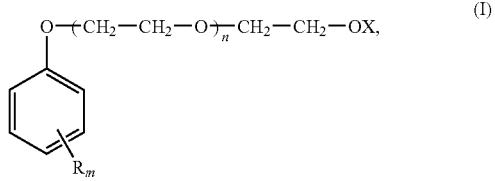

TABLE II

| Code | n | X | R | m |
|------|-----|---|-------|---|
| A | 8 | H | C9 | 1 |
| B | 11 | H | C9 | 1 |
| C | 39 | H | C9 | 1 |
| D | 149 | H | C9 + C9 | 2 |
| E | 11 | H | C8 | 1 |

TABLE III

| | | After dye deposition | | After silane treatment | |
|---|---|---|---|---|---|
| | Activator | ASTM | Polarization | ASTM | Polarization |
| Code No. | Composition | haze (%) | efficiency (%) | haze (%) | efficiency (%) |
| AC1 (Comparative) | 0.5% A | 0.56 | 98.8 | 1.40 | 97.1 |
| AC2 | 0.5% B | 0.29 | 99.4 | 1.11 | 97.3 |
| AC3 | 0.5% C | 0.29 | 99.6 | 0.59 | 98.9 |
| AC4 | 0.5% D | 0.27 | 99.5 | 0.47 | 98.8 |
| AC5 | 0.35% A and 0.15% C | 0.28 | 99.5 | 1.34 | 98.4 |
| AC6 | 0.25% A and 0.25% C | 0.28 | 99.5 | 1.22 | 98.4 |
| AC7 | 0.15% A and 0.40% C | 0.25 | 99.5 | 0.71 | 98.5 |
| AC8 | 0.05% C and 0.45% B | 0.27 | 99.3 | 1.08 | 97.7 |
| AC9 | 0.15% C and 0.35% B | 0.28 | 99.4 | 0.92 | 97.8 |
| AC10 | 0.25% C and 0.25% B | 0.29 | 99.5 | 0.97 | 98.0 |
| AC11 | 0.25% C and 0.05% B | 0.28 | 99.8 | 2.82 | 99.1 |
| AC12 | 0.34% C and 0.06% B | 0.28 | 99.7 | 1.14 | 99.1 |
| AC13 | 0.42% C and 0.08% B | 0.25 | 99.7 | 0.88 | 99.0 |
| AC14 | 0.50% C and 0.10% B | 0.24 | 99.6 | 0.61 | 99.2 |
| AC15 | 0.67% C and 0.13% B | 0.29 | 99.6 | 0.56 | 99.2 |
| AC16 | 0.84% C and 0.16% B | 0.29 | 99.7 | 0.52 | 99.0 |
| AC17 | 0.5% E | 0.30 | 99.4 | 1.14 | 97.9 | wherein:
the average of the number n of all of the surfactant molecules ranges from 9 to 200;
m is 1 or 2;
R, in the molecular structure of each of the surfactants, independently and at each occurrence, is an alkyl;
at least one R in the molecular structure of each of the surfactants is a C6-C12 straight-chain alkyl or a C6-C12 branched alkyl;
X, in the molecular structure of each of the surfactants, independently and at each occurrence, is an H or a C1-C4 alkyl; and
the plurality of surfactants includes the following two groups (A) and (B) of surfactants:
Group (A), having a total number of molecules MA, wherein the average of the number n of the molecules MA ranges from 8 to 20; and
Group (B), having a total number of molecules MB, wherein the average of the number n of all the molecules MB ranges from 30 to 200.

2. The dispersion according to claim 1, wherein the concentration of the plurality of non-ionic surfactants ranges from 0.1% to 10% by weight of the total weight of the dispersion.

3. The dispersion according to claim 1, wherein the ratio MA/MB ranges from 1/10 to 10/1.

4. The dispersion according to claim 1, wherein the ratio MA/ranges from 1/10 to 1/5.

5. The dispersion according to claim 1, wherein the surfactant molecules in Group (A) have a polydispersity index that ranges from 1 to 2; and the surfactant molecules in Group (B) have a polydispersity that ranges from 1 to 2.

6. The dispersion according to claim 1, wherein the number average molecular weight over the plurality of non-ionic surfactants is from 620 to 10,000 g/mol$^{-1}$.

7. The dispersion according to claim 1, wherein the molecular structure of the polarizing dye comprises an anion group.

8. A process for making a light-polarizing article, the process comprising the steps of:
(A) providing a light-transmitting substrate having at least one surface;
(B) forming a plurality of micro-grooves on the surface of the substrate;
(C) coating the surface having micro-grooves with the polarizing dye dispersion according to claim 1; and
(D) forming a polarizing dye layer on the surface.

9. The process according to claim 8, wherein:
step (A) comprises the following sub-step (A2):
(A2) depositing an inorganic intermediate adhesion-promoting layer on the surface of the substrate;
and,
step (B) comprises forming a plurality of micro-grooves on the surface of the inorganic intermediate adhesion-promoting layer.

10. The process according to claim 8, further comprising the following step (F):
(F) forming a second functional layer over the polarizing dye layer.

11. The process according to claim 10, further comprising the following step (E) between steps (D) and (F):
(E) forming a first coupling layer directly over and contiguous with the polarizing dye layer.

12. The process according to claim 11, wherein step (E) comprises forming a first coupling layer comprising a molecular structure, the molecular structure including ionic groups having charges opposite to the polarizing dye molecule or groups capable of forming ions having charges opposite to the polarizing dye molecules of the light-polarizing layer.

13. The process according to claim 11, wherein the light-polarizing dye molecules in step (E) comprise an anionic group coupled to the molecular structure of each of the light polarizing molecules.

14. The dispersion according to claim 1, wherein the average number n of the surfactant molecules of Group (A) ranges from 9 to 20 and the average number n of the surfactant molecules of Group (B) ranges from 40 to 100.

* * * * *